United States Patent
Patsenker et al.

(10) Patent No.: US 7,904,965 B1
(45) Date of Patent: Mar. 8, 2011

(54) USER ACTION SECURITY AUDITING

(75) Inventors: Svetlana Patsenker, Wayland, MA (US); Yevgeniy Motov, Brighton, MA (US); Keith Alan Carson, Jr., Hopkinton, MA (US); Anoop George Ninan, Milford, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1012 days.

(21) Appl. No.: 11/731,679

(22) Filed: Mar. 30, 2007

(51) Int. Cl.
*G06F 7/04* (2006.01)
*G06F 21/00* (2006.01)

(52) U.S. Cl. .......................... 726/28; 713/182
(58) Field of Classification Search .............. 726/28; 713/182
See application file for complete search history.

(56) References Cited

U.S. PATENT DOCUMENTS

| | | | |
|---|---|---|---|
| 6,889,309 B1 * | 5/2005 | Oliveira et al. | 711/203 |
| 7,007,048 B1 * | 2/2006 | Murray et al. | 1/1 |
| 7,685,261 B1 * | 3/2010 | Marinelli et al. | 709/220 |
| 2003/0188218 A1 * | 10/2003 | Lubbers et al. | 714/5 |
| 2003/0221124 A1 * | 11/2003 | Curran et al. | 713/201 |
| 2004/0030822 A1 * | 2/2004 | Rajan et al. | 711/4 |
| 2004/0250113 A1 * | 12/2004 | Beck | 713/201 |
| 2005/0108414 A1 * | 5/2005 | Taylor et al. | 709/231 |
| 2006/0080465 A1 * | 4/2006 | Conzola et al. | 709/245 |
| 2007/0112870 A1 * | 5/2007 | Korupolu et al. | 707/200 |
| 2007/0157288 A1 * | 7/2007 | Lim | 726/1 |

\* cited by examiner

*Primary Examiner* — Techane J Gergiso
(74) *Attorney, Agent, or Firm* — Krishnendu Gupta; Gerald P. Kazanjian

(57) ABSTRACT

In a storage area network (SAN), a SAN management application provides a security audit log of security sensitive user actions performed across the storage area network. In a SAN, multiple services operate to perform requested user actions. Configurations herein substantially overcome the shortcomings of conventional SAN security event logging by providing a comprehensive security audit mechanism operable to identify and record user actions. An event normalizer disposed in each of the services identifies requested user actions, creates a uniform user action object, and sends the user action object to a coalescer operable to receive user action objects from the plurality of services in the SAN. The user action object provides a generic template responsive to each of the event normalizers in the services. The event normalizers normalize event properties and attributes concerning a user action into the generic user action object, and employs pre-existing conduits for gathering and recording events.

17 Claims, 9 Drawing Sheets

USER ACTION SECURITY AUDITING

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator. The SAN operators, or users, issue commands for directing various services available via the management application.

The modern trend of increasing privacy and security awareness of electronic storage mediums drives a need for centralized repositories of sensitive data to monitor and track access. In a storage area network, users require timely unhindered access to requested data, yet security expectations place the onus on network service providers to prevent dissemination of sensitive information to unauthorized parties. Accordingly, storage area network (SAN) operators strive to audit and monitor user activity in a SAN. In a large SAN, however, many users may have multiple levels and/or designations of appropriate access to SAN resident data. Often, privilege and access control mechanisms are employed to associate users to particular data sources and prevent access to inappropriate or disallowed data.

SUMMARY

In a storage area network (SAN), conventional security practices include a complex scheme of privileges associated with users and data objects tagged with privileges required for access. Further security and/or user compartmentalization may be provided by conventional grouping and masking of users and storage arrays such that users may "see" only storage arrays having relevant data. With the modern trend of increasing security awareness, coupled with heightened scrutiny of sensitive data flows, SAN dependent organizations such as large corporations, financial institutions and record keeping entities (i.e. medical service providers) bear increasing liability risk for inappropriately divulged information. Accordingly, it would be beneficial to provide an audit log to identify and record user actions with respect to sensitive data access, therefore providing an audit trail that associates users to access attempts in the event propriety of data access is questioned. In a conventional SAN, however, auditing of all user actions to provide an accurate and complete audit trail of access to sensitive data may be problematic and/or extensive. Information pertaining to user actions or other security information may be disbursed across several existing logs or data stores. Therefore, conventional SANs may suffer from the shortcoming that a complete and comprehensive audit trail of user actions potentially affecting sensitive data stores may be piecemeal or incomplete.

Increased security requirements expected by customers of SAN vendors mandate that all user actions that result in configuration changes of SAN managed objects or the server managing those objects be recorded for audit. Accordingly, logging of active (i.e. user entered) commands at the console provides a record of activity. However, by capturing additional detailed information and providing closure (i.e. complete coverage) on the points at which such user actions emanate, a log of security audit records is created. Further, such a log may be exported or queried for GUI display or command history files.

Configurations disclosed herein provide a security audit log (audit log) of security sensitive user actions performed across the storage area network. In a large SAN, multiple managed objects, or manageable entities, such as network nodes and software agents, operate to service user actions. Configurations herein substantially overcome the shortcomings of conventional SAN security event logging by providing a security audit logging mechanism operable to identify and record user actions throughout the SAN. The audited user actions are performed by services, emanating from a console and fulfilled by the services and various agents operating on multiple hosts (nodes) in the SAN. An event normalizer disposed in each of the services identifies requested user actions, creates a uniform user action object indicative of the user action, and sends the user action object to a security event coalescer (coalescer) operable to receive user action objects from the plurality of services in the SAN.

Increasing security requirements by SAN users request that all user actions resulting in a configuration change be recorded for audit purposes. In this manner, the user action object provides a generic template, or form, responsive to each of the event normalizers in the services. The event normalizers normalize event properties and attributes concerning a user action event into the user action object. The normalized user action object employs preexisting conduits in the SAN software for gathering and recording events such as commands, accesses and occurrences. The user action object, common to all user actions, stores common event properties and attributes specific to the particular user action. The user action object therefore provides a generic security transaction operable for coalescing. The coalescer coalesces each of the user action objects received form each of the services by recording a security audit log responsive to a graphical user interface (GUI) for screen display or file/hardcopy export.

In further detail, the method for monitoring user actions in a storage area network (SAN) disclosed herein includes receiving, in a network server, a user action, and invoking, responsive to the user action, a service operable to perform the user action. The invoked service gathers information, such as properties and attributes, about the user action, and an event normalizer normalizes the gathered information by building a user action object indicative of the user action. The service sends, via a preexisting logging conduit, the normalized user action object to a security event coalescer, and the security event coalescer, coalesces the sent user action object with at least one other sent user action object. The coalescer then recording each of a plurality of coalesced user action objects.

The disclosed approach therefore shows an architecture for a storage area network server operable to audit security sensitive actions across a plurality of services. The SAN server is operable to identifying user initiated operations requiring scrutiny as security sensitive actions, in which the security sensitive actions are operable to manipulate the SAN configuration. The server locates a preexisting conduit for capturing dissimilar types of events from a plurality of services, and directs each of the services of the plurality of services to employ the preexisting conduit for reporting identified security sensitive actions. The coalescer reporting security sensitive actions via the preexisting conduit, or logging mechanism, avoiding redesigning or retrofitting each occurrence of a security sensitive user action. Accordingly, in the example arrangement shown, the preexisting conduit is applicable, without modification, to a plurality of the security sensitive actions, each of the services having an event normalizer operable to populate a user action object adapted to store information about the user initiated operation. The event normalizer further identifies properties common to each of the user action objects, and enumerating attributes of the particular user initiated operation.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A SAN management application provides a security audit log of security sensitive user actions performed across the storage area network. In a large SAN, multiple managed objects, or manageable entities, operate, such as network nodes and software agents, operate to service user actions. Configurations herein substantially overcome the shortcomings of conventional SAN security event logging by providing a comprehensive security audit logging mechanism operable to identify and record user actions throughout the SAN.

Increasing security requirements by SAN users suggests that all user actions resulting in a configuration change be recorded for audit purposes. In this manner, the user action object provides a generic template or form responsive to each of the event normalizers in the services. The event normalizers normalize event properties and attributes concerning a user action event into the generic user action object. The normalized user action object employs preexisting conduits in the SAN software for gathering and recording events such as commands, accesses and occurrences. The user action object, common to all user actions, stores common event properties and attributes specific to the particular user action. The user action object therefore provides a generic security transaction operable for coalescing. The coalescer coalesces each of the user action objects received form each of the services by recording a security audit log responsive to a graphical user interface (GUI) for screen display or file/hard-copy export.

In the storage area network, it may require substantial effort to identify and modify each invocation of a service for performing a user action. However, preexisting logging conduits exist in a typical system for recording logs of various activities, such as commands, alerts, and maintenance. Logging conduits receive an object according to a predetermined format and write, print or record the contents of the object. Configurations herein employ preexisting logging conduits using the generic security transaction for coalescing, or channeling the occurrences of user actions, to a security audit log to provide complete coverage of user actions. In this manner, each individual user action occurrence need not specifically create and invoke new communication paths, or conduits, because the generic security transaction employs preexisting logging conduits.

In a particular managed information environment, facilities may exist for logging commands, for example. The network infrastructure, managed on the server, identifies and captures user issued commands for logging, recovery, and other purposes. Since such a command log capability intercepts all entered user commands, the command logging may be employed as a focal point for scrutiny of user actions. The existing facilities operable to capture user entered commands may be utilized for funneling and scrutinizing such user commands for user actions that trigger audit processing.

Figure 1:
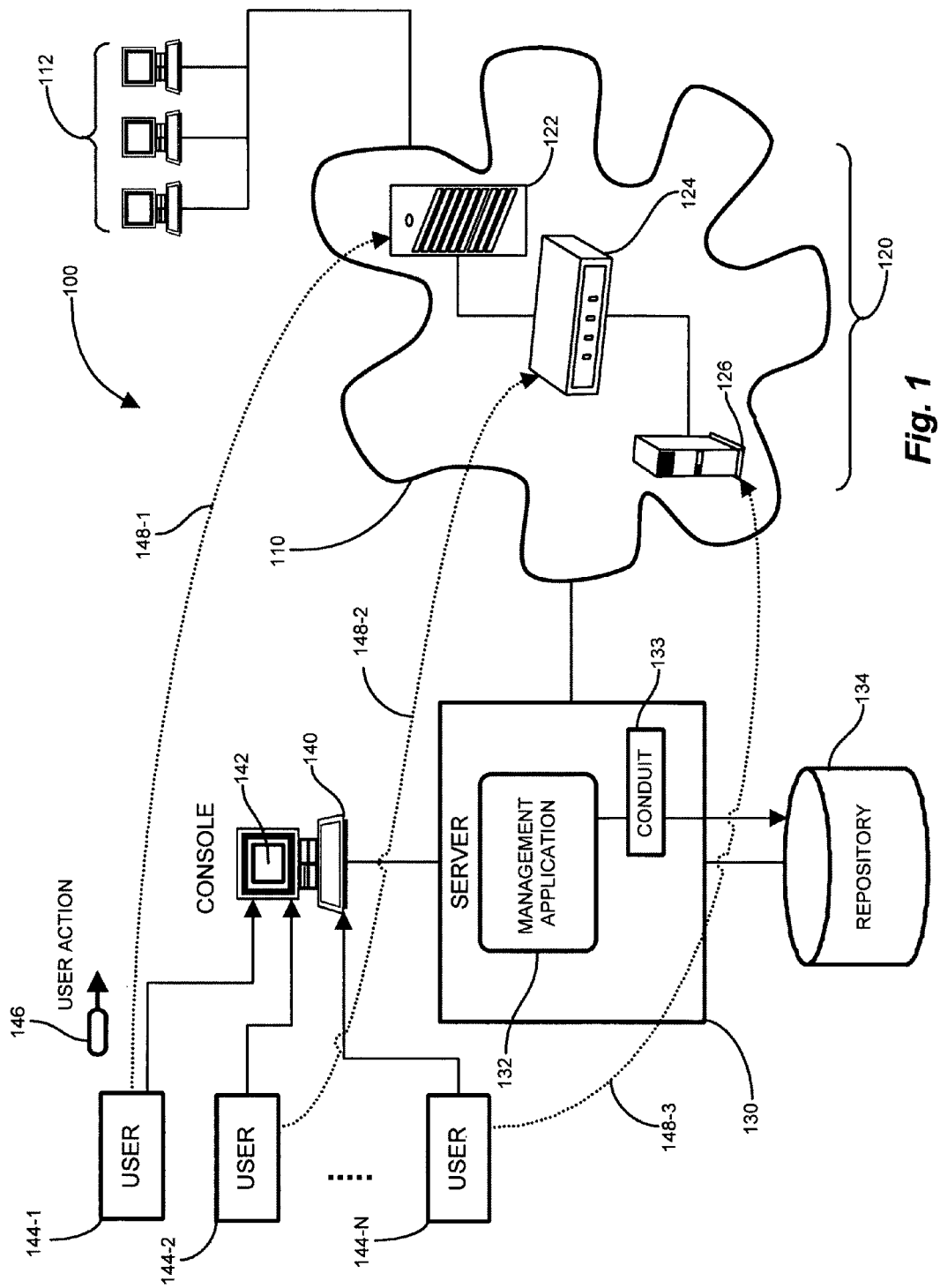
FIG. 1 is a context diagram of an exemplary managed information environment suitable for use with the present invention.

FIG. 1 is a context diagram of an exemplary managed information environment suitable for use with the present invention. Referring to FIG. 1, a managed information environment 100 includes a storage area network 110 (SAN) operable to provide mass data storage and retrieval services to a plurality of SAN users 112. The storage area network is an interconnection of SAN nodes 120, including storage arrays 122, connectivity devices 124 (i.e. routers, hubs and switches) and hosts 126. Each of the SAN nodes 120 is responsive to a server 130, which executes a management application 132 for monitoring and managing the SAN nodes 120. The management application 132 recognizes each of the SAN nodes 120 as manageable entities for gathering statistical and operational data and issuing commands. The management application 132 is responsive to a console 140 providing a user interface 142. Each of the SAN nodes 120 is responsive to the management application 132 as a manageable entity, and is operable to receive the commands for performing a particular user action.

SAN operators, or users 144-1 ... 144-N (144 generally), issue commands (user actions) 146 to the management application 132 via the console 140. The users 144 are typically experienced technicians or engineers well versed in SAN operation, as opposed to the users 112 in the general user community. The commands 146, therefore, result in certain actions by one or more of the manageable entities (i.e. nodes 120). In a typical managed information environment 100, the console 140 and server 130 are disposed in a central location, such as a machine room, along with at least some of the other manageable entities 120. Alternatively, the console 140 may be deployed in a remote location to facilitate remote SAN management, having a LAN, WAN or other suitable remote connection to the server 130. Configurations discussed herein identify and track the commands 146 entered by the users 144 for directing a particular node 120 to perform a specific action in response to the command 146.

During typical operation, SAN users 144 (operators) issue various commands 146 affecting the multiplicity of SAN nodes 120, as shown by arrows 148-1 ... 148-3, respectively. Through the steps discussed further below, the management application 132 identifies and logs the commands 146 in a log repository 134 operable to store a user action log or other persistent structure of the issued commands. Since the logged actions 148 emanate from a particular user 144 and affect a particular manageable entity (node) 120, the log repository 134 provides a security audit log of commands 146 issued by users that can reconcile occurrences in the SAN 110 and identify an association to a particular user. The resulting security audit log therefore includes all user-initiated actions deemed to affect or invoke security related operations within the SAN 110.

Figure 2:
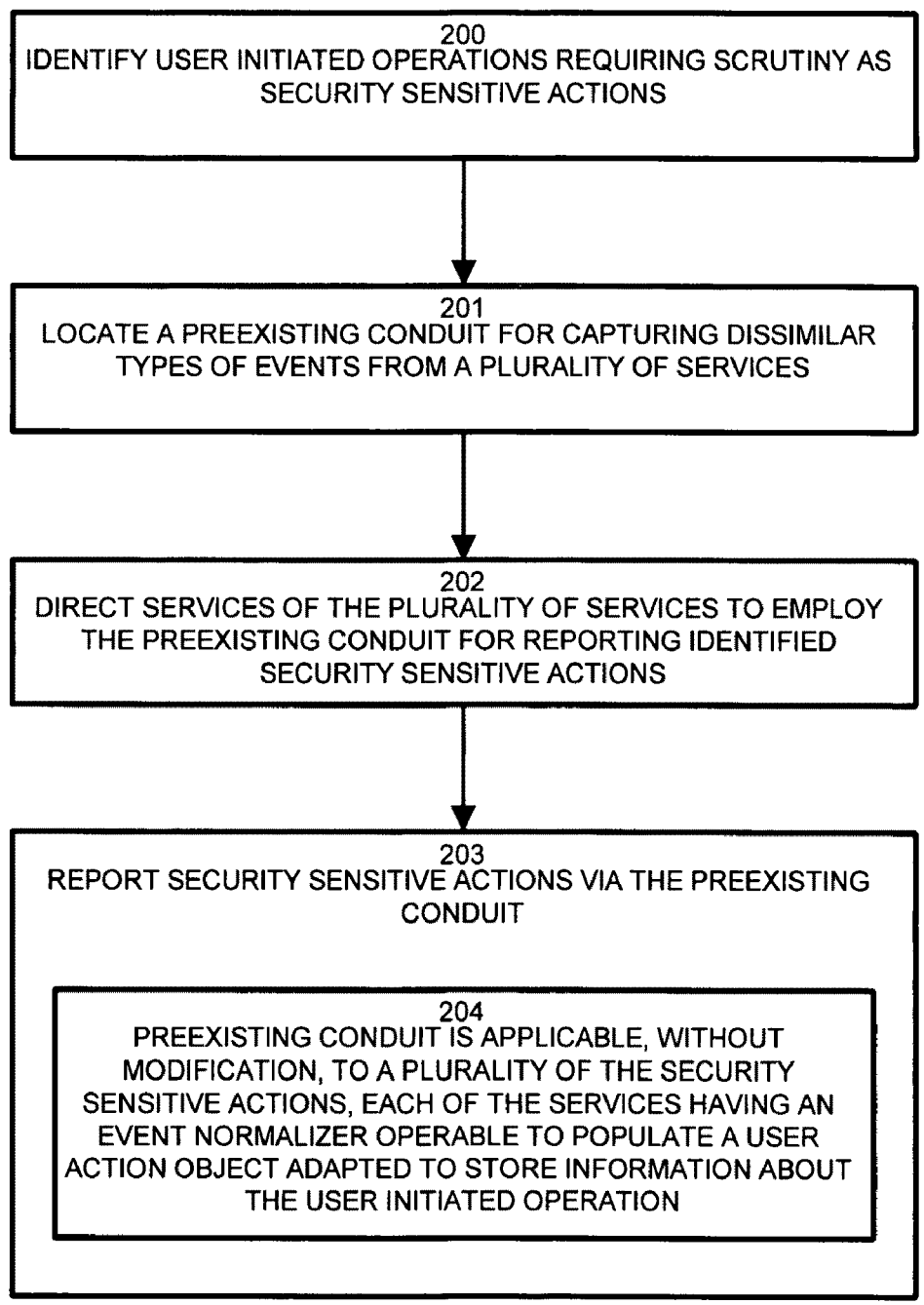
FIG. 2 is a flowchart of transaction processing in the environment of FIG. 1.

FIG. 2 is a flowchart of transaction processing in the environment of FIG. 1. Referring to FIGS. 1 and 2, the disclosed method for auditing security sensitive actions across a plurality of services includes, at step 200, identifying user initiated operations requiring scrutiny as security sensitive actions. In the SAN, user 144 initiated actions invoke one or more of available services 136-N (FIG. 3, below) for carrying out the action. Each such service and the instruction or operation performing the action is identified. At the identified operation or instruction, the service locates a preexisting conduit for capturing dissimilar types of events from a plurality of services, as depicted at step 201. In the SAN, mechanisms and/or facilities exist for collecting events, alerts and commands. Such preexisting conduits 133 are also operable for transporting user actions pertaining to security. Monitoring of additional user actions as security sensitive occurrences need not trigger additional communication threads or channels to capture the user action.

The server 130 directs the services of the plurality of services to employ the preexisting conduit 133 for reporting identified security sensitive actions, as depicted at step 202, thus aggregating or coalescing all the security sensitive user actions via the preexisting conduit 133. The server 130 creates an audit log by reporting security sensitive actions received from the preexisting conduit 133. The preexisting conduit 133 is therefore applicable, without modification, to a plurality of the security sensitive actions, in which each of the services has an event normalizer operable to populate a user action object adapted to store information about the user initiated operation (user action), as depicted at step 204. Therefore, the user action object is operable as a generic security transaction employed by each of the services 136 for reporting security sensitive user actions.

Figure 3:
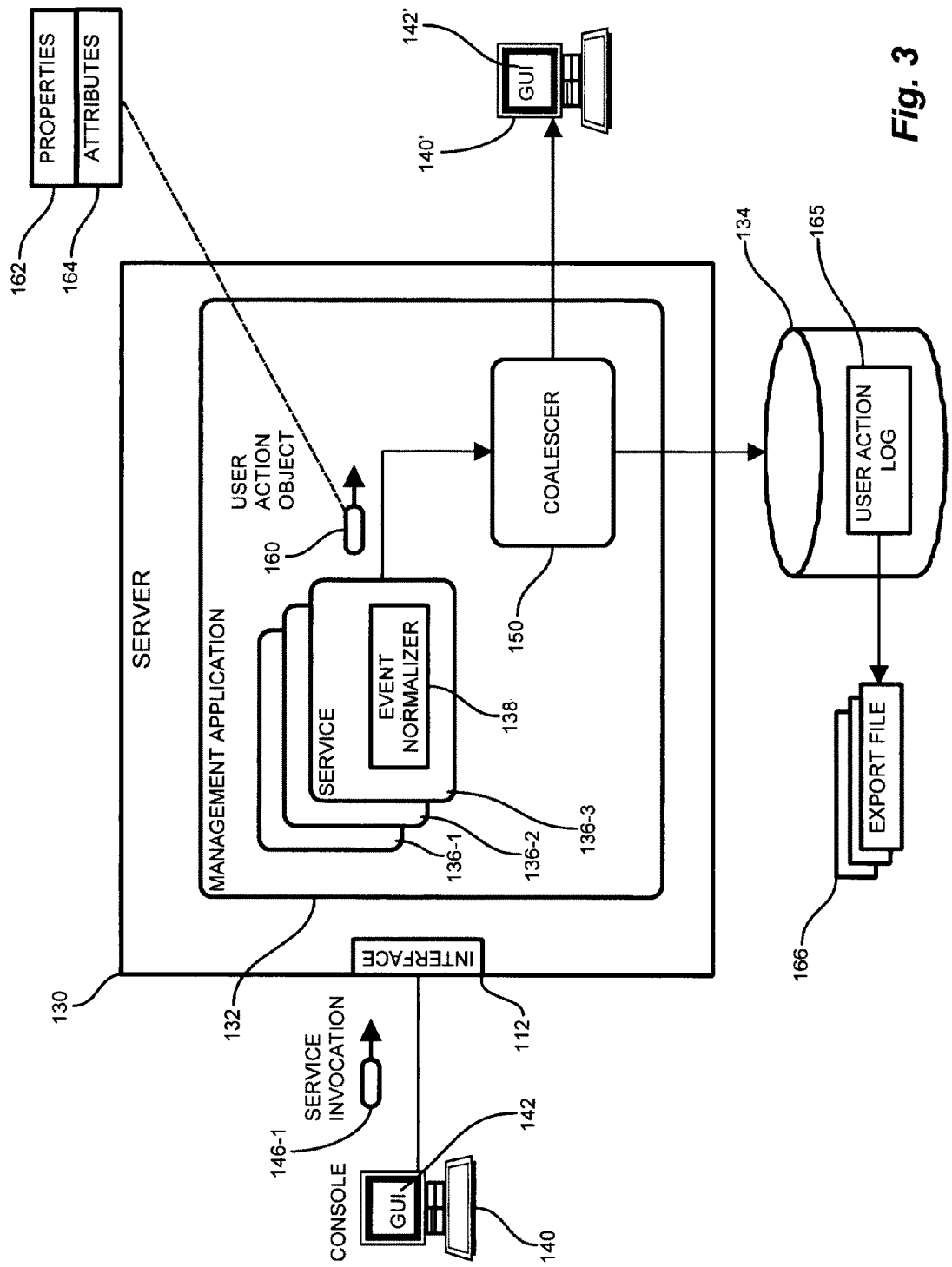
FIG. 3 is a block diagram of processing a user action object as a transaction in the environment of FIG. 1.
Figure 4:
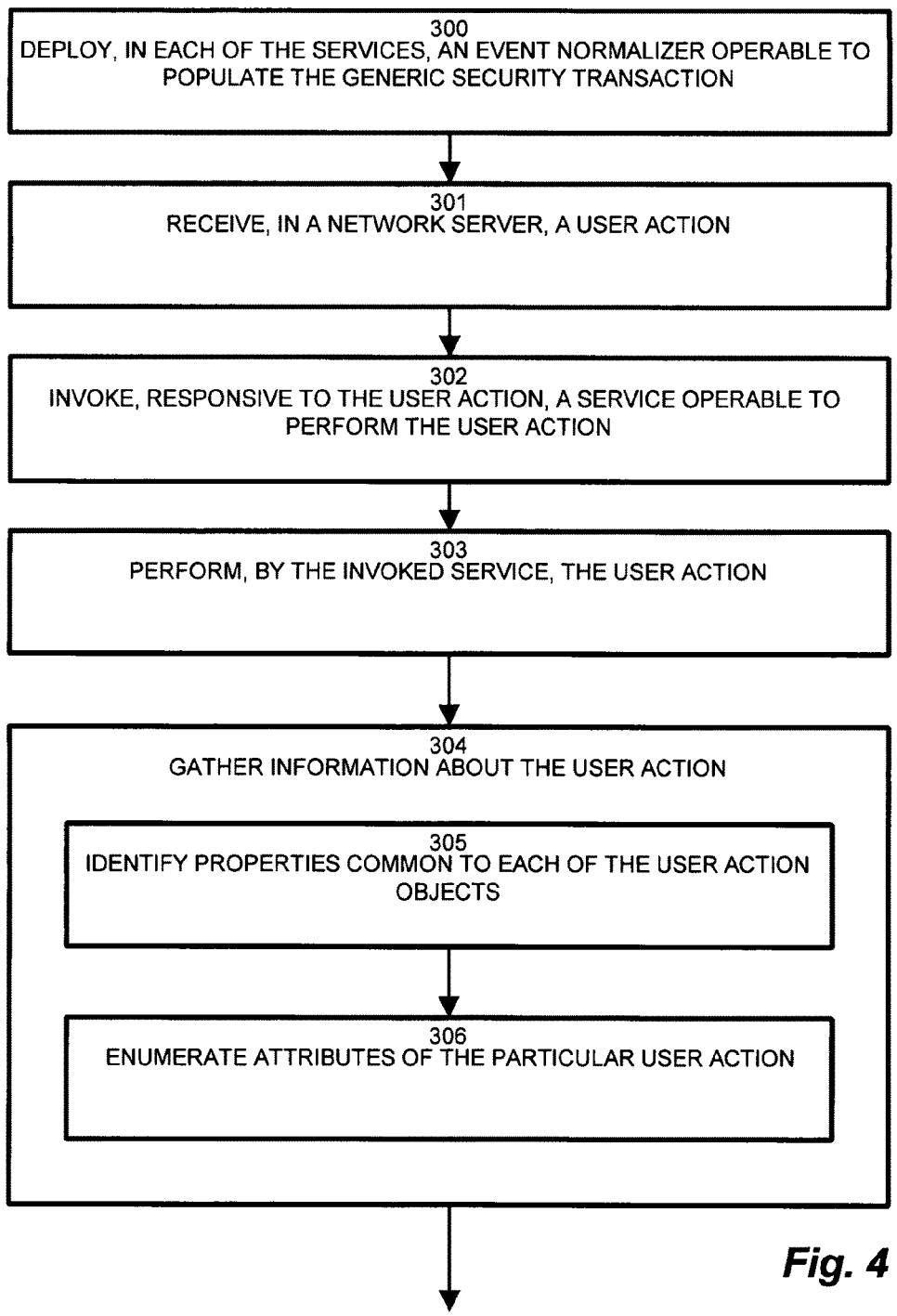
FIGS. 4-7 are a flowchart of user action object processing in the arrangement of FIG. 3.
Figure 5:
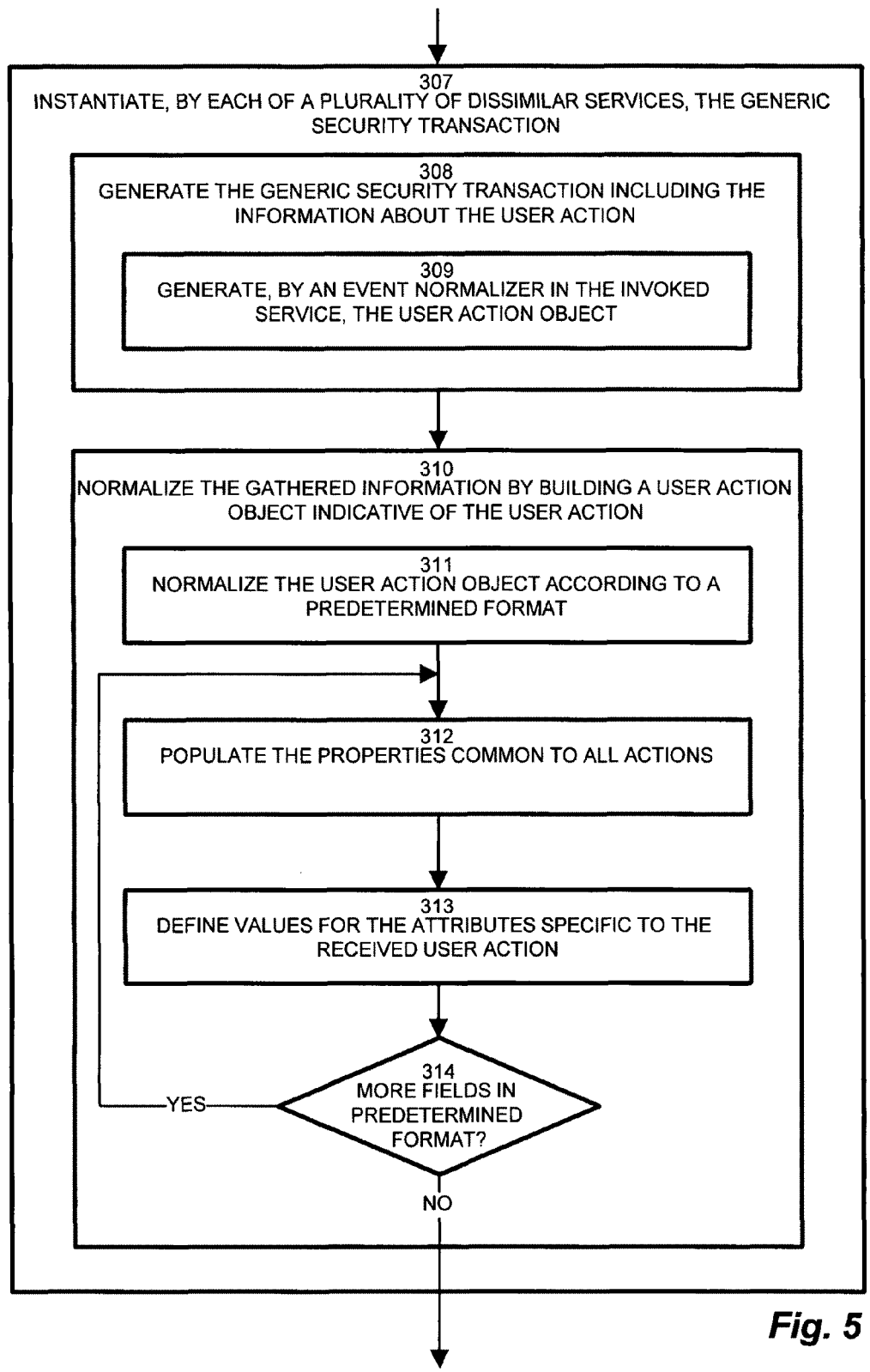
Figure 6:
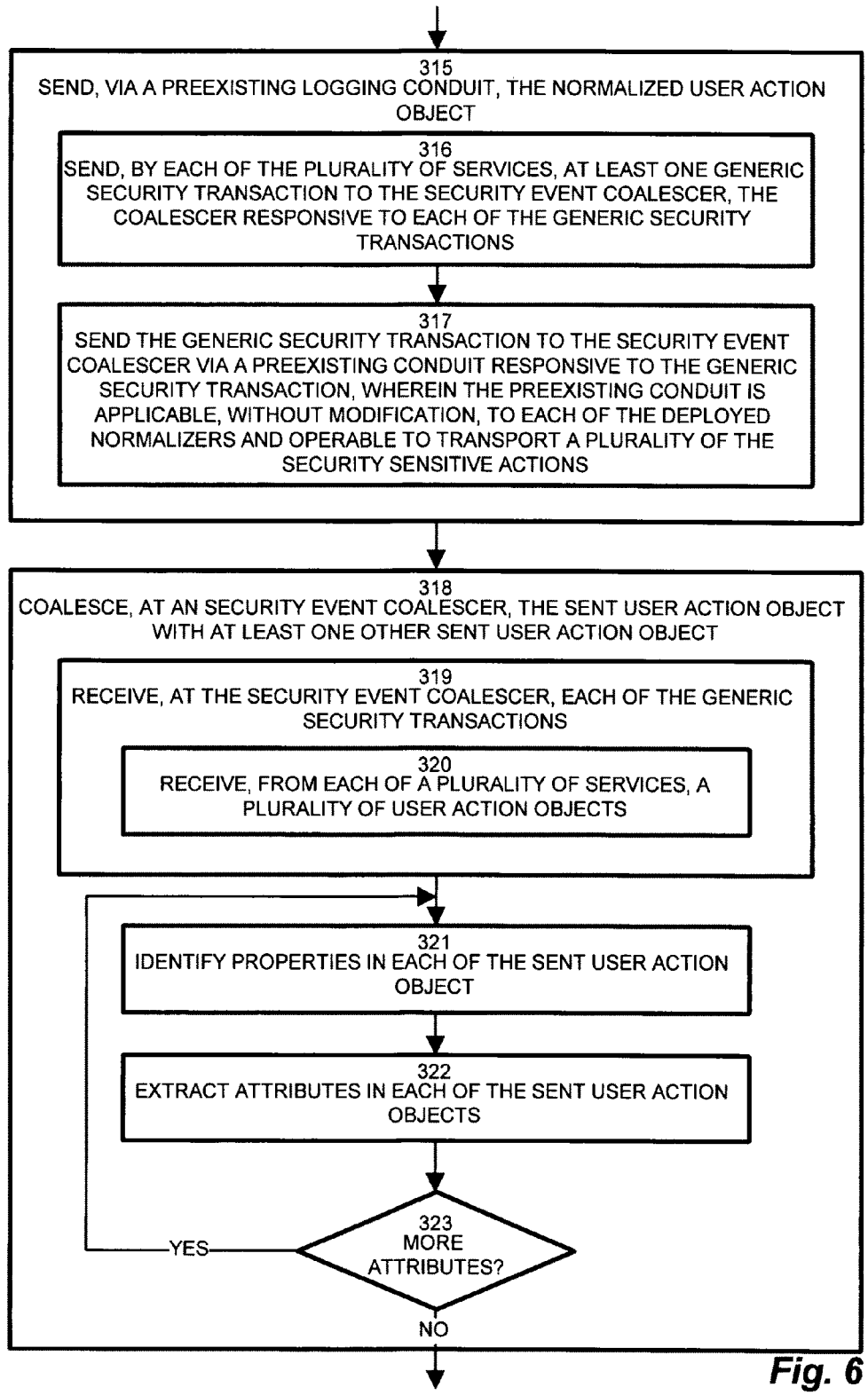

FIG. 3 is a block diagram of processing a user action object 160 as a transaction in the environment 100 of FIG. 1. Referring to FIGS. 1 and 3, a command 146 takes the form of a service invocation 146-1 from the console via the interface 112. The management application 132 includes a plurality of services 136-1 ... 136-3 (136 generally) for performing the requested user action. Each of the services 136 include an event normalizer for normalizing information concerning the event into a user action object 139. The user action object 160 includes properties 162 specifying information common to each identified command 146 or action, and attributes 164 specific the particular action. Further, the properties 162 and attributes each have field values, discussed further below in GUI 142 screen examples in FIGS. 7 and 8.

Figure 7:
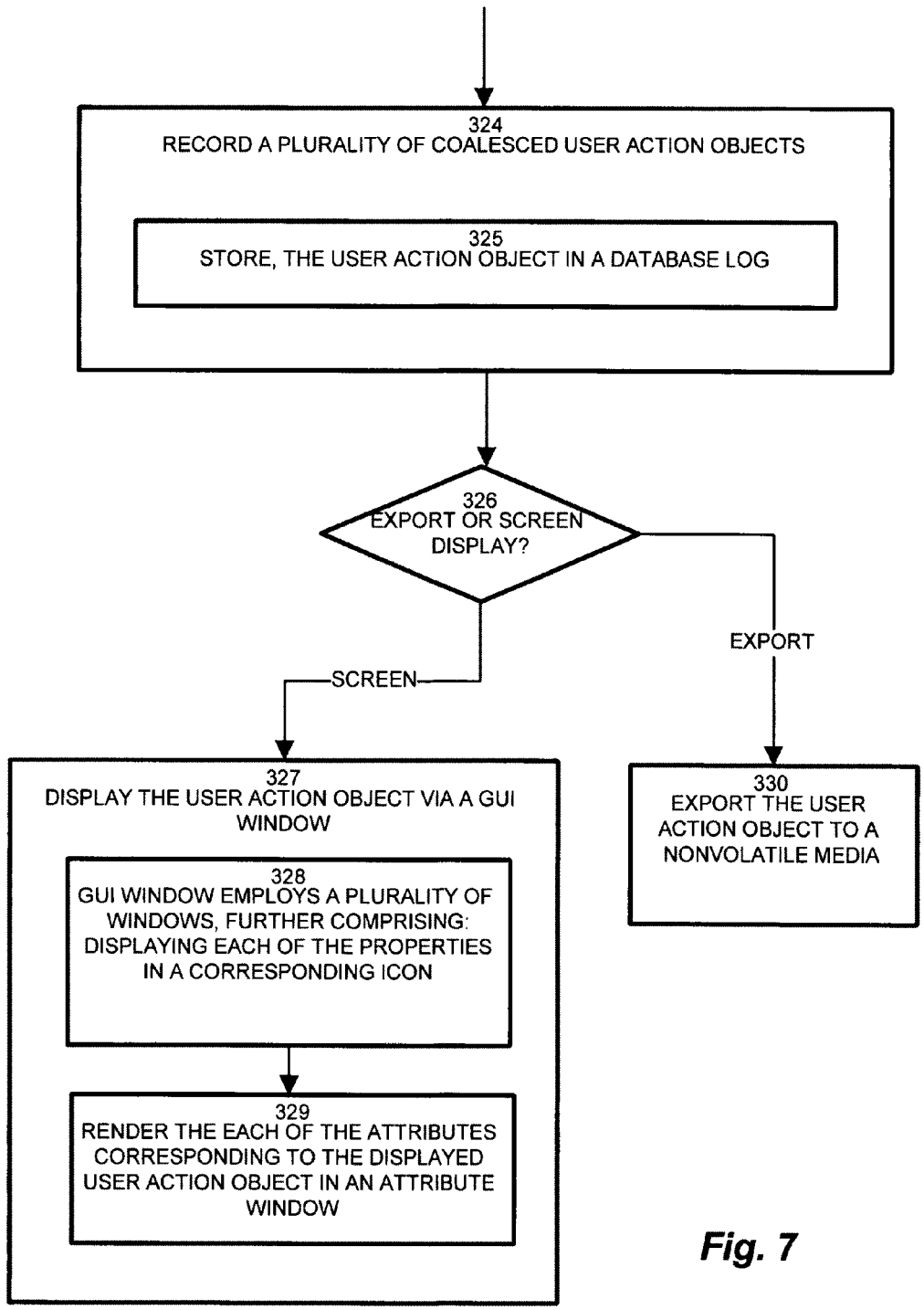
Figure 8:
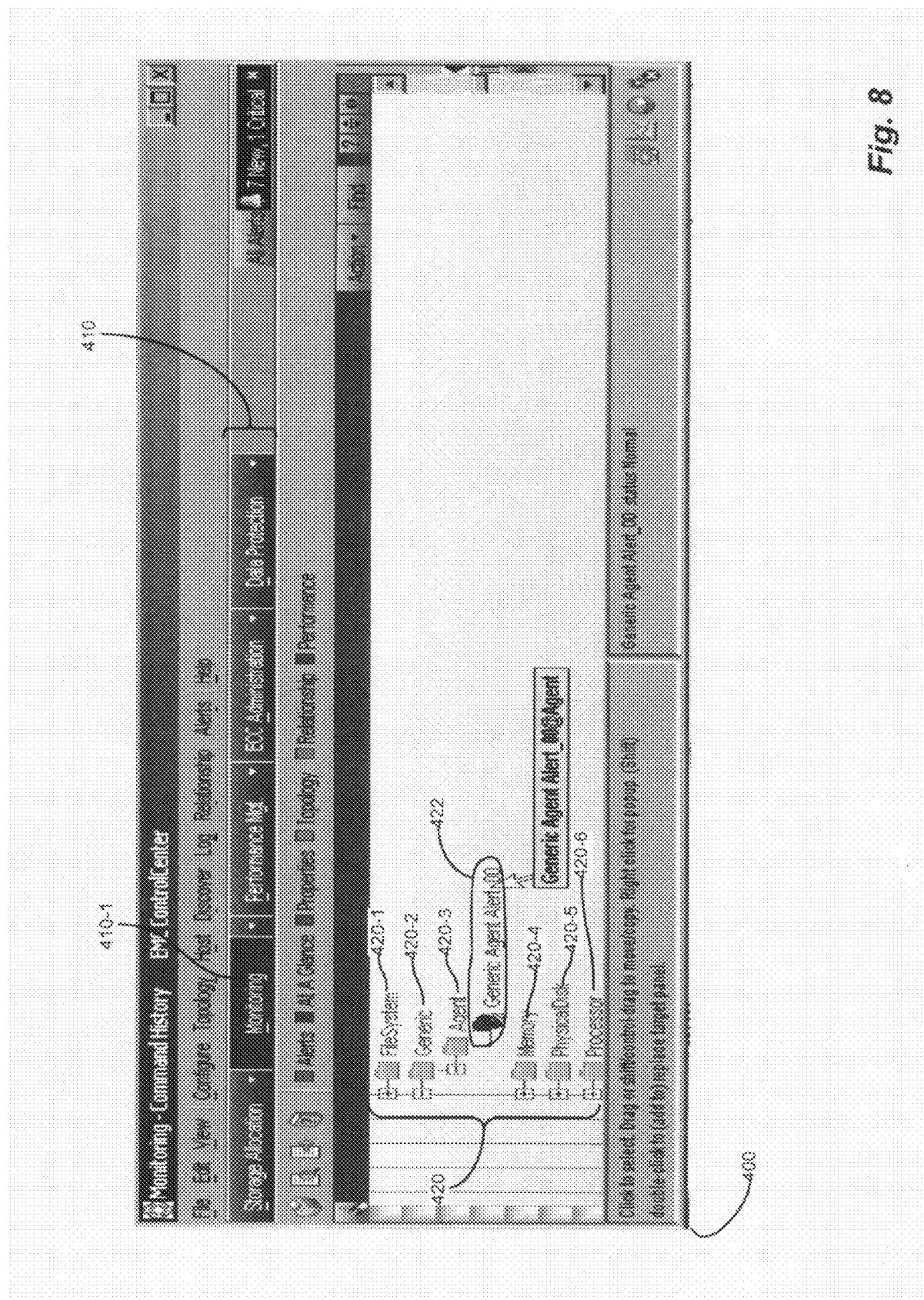
FIG. 8 is a screen display of a graphical user interface (GUI) for extracting recorded security events.

The user action object 160 is a normalized transaction in a generic format generated by each of the event normalizers 138 in each service 136. The services 136 each send the normalized user action objects to a coalescer 150 for aggregating and combining the user action objects 160 into a user action log 165 in the repository 134. The coalesced user action objects 160 may subsequently be exported via an export file 166 or displayed on a GUI screen 142' via a display device 140' (not necessarily the console 140), as shown in FIGS. 7 and 8 below.

In the example configuration, the event normalizer 138 and user action object 160 employ a preexisting event or alert aggregating conduit 133. The use of preexisting conduits such as logging facilities is beneficial because addition of reportable actions and commands employs the existing conduits, or transmission paths, for generating the fields 162, 164 of the user action object 160 and transporting the user action object to the coalsecser 150. This avoids design modifications exclusively for the purpose of identifying, generating, and transporting an identified security action.

Addition of new auditable security events therefore involve identifying the service 1356 providing the requested action, and adding an invocation to generate a corresponding user action object 160 with the pertinent fields. In this manner, the user action object 160 defines a generic security transaction applicable to a variety of auditable user actions. The event normalizer 138, already operable to transport a user action object 160, is invoked by the service 136 to send the user action object to toe coalescer 150.

FIGS. 4-7 are a flowchart of user action object processing in the arrangement of FIG. 3. Referring to FIGS. 1 and 3-7, the disclosed method for monitoring user actions in a storage area network (SAN) employs a generic security transaction operable to coalesce a plurality of user action objects via the preexisting conduit 133. The server 130 deploys, in each of the services 136, an event normalizer 138 operable to populate the generic security transaction, as depicted at step 300. In the example configuration, the generic security transaction is a user action object 160 operable to include information about a user action, i.e. command 146. The network server 130 receives an indication of the user action such as the service invocation 146-1, as shown at step 301, and invokes, responsive to the user action, a service 136 operable to perform the user action, as disclosed at step 302. The services 136 perform various SAN management and monitoring tasks, such as changing data collection policies (DCPs) or times, generating reports, adding and deleting users, as well as other typical configuration changes triggering scrutiny for security audit purposes.

The invoked service 136 performs the requests user action, as depicted at step 303, and the service 136 begins gathering information about the user action 146, as shown at step 304. Each user action triggering (mandating) security audit logging results in gathering of particular fields about the user action (command) 146. Each such user action 146 has properties common to all user actions and attributes about the particular action 146. Accordingly, gathering information about the user action includes identifying properties common to each of the user action objects 160, as depicted at step 305, and enumerating attributes of the particular user action 146, as shown at step 306. In an example arrangement, shown below with respect to FIGS. 7 and 8, the parameters include fields such as the user, operation name and result, while attributes are specific to the action 136 or operation such as a summary text description.

The user action object 160 includes fields operable for population by each of the services 136 in response to a user action 146. The services 136 provide pertinent properties 162 and attributes 164 for the particular action 146. The user action object 160 is a generic security transaction adaptable to a plurality of services 136. Accordingly, in response to a respective user action, each of a plurality of dissimilar services 136, instantiates the generic security transaction, as depicted at step 307. This includes generating the generic security transaction including the information about the user action, as shown at step 308. In the example configuration, each of the services includes an event normalizer 138 for gathering the properties 162 and attributes 164 and storing or arranging in a normalized form in the user action object 160. In the example configuration shown, each of the services 136 generates, by an event normalizer 138 in the invoked service 136, the user action object 160, as shown at step 309.

Once invoked, the event normalizer 138 employs the instantiated user action object 160 for normalizing the gathered information by building a user action object indicative of the user action, as depicted at step 310. Normalizing includes normalizing the user action object 160 according to a predetermined format, as disclosed at step 311. The generic security transaction, shown further below in FIG. 7, defines the predetermined format including the properties 162 and attributes 164. The event normalizer 138 populates the properties 162 common to all actions, as depicted at step 312, and defines values for the attributes 164 specific to the received user action 146, shown at step 313. The normalizer iterates though available files in the generic security transaction, thus a check is performed at step 314 to determine if there are more properties or attributes for population, and control reverts to step 312 accordingly.

After generating the user action object 160, the event normalizer 138 sends, via a preexisting logging conduit 133, the normalized user action object 160, as shown at step 315. In the managed information environment 100, this results in sending, by each of the plurality of services 136, at least one generic security transaction to the security event coalescer 150, in which the coalescer is responsive to each of the generic security transactions (e.g. user action objects) 160, as shown at step 316. In the example configuration, the coalescer 150 aggregates the user action objects 160 via the preexisting logging features in the server infrastructure or operating system, thus avoiding development of specific interprocess or internodal (i.e. ports, sockets, shared memory) arrangements for coalescing the user action objects 160. Each of the services 136 sends the generic security transaction to the security event coalescer 150 via a preexisting conduit 130 responsive to the generic security transaction 160, as depicted step 317. Comprehensive auditing coverage is provided because the preexisting conduit is applicable, without modification, to each of the deployed event normalizers 138 and is operable to transport a plurality of the security sensitive actions as user action objects 160.

Upon receipt, the security event coalescer 150 coalesces each of the sent user action objects 160 with the other sent user action objects 160, as depicted at step 318. This involves receiving, at the security event coalescer 150, each of the generic security transactions, as shown at step 319, thus receiving, from each of a plurality of services 135, a plurality of user action objects 160, as disclosed at step 320. For each received user action object, the coalescer iteratively identifies properties the 162 in each of the sent user action objects 160, as depicted at step 321, and also extracts the attributes 164 in each of the sent user action objects 160, as disclosed at step 322. A check is performed for additional fields (properties 162 or attributes 164) in the received user action object 160, as depicted at step 323, and control reverts to step 321 to extract all fields from the user action object.

Figure 9:
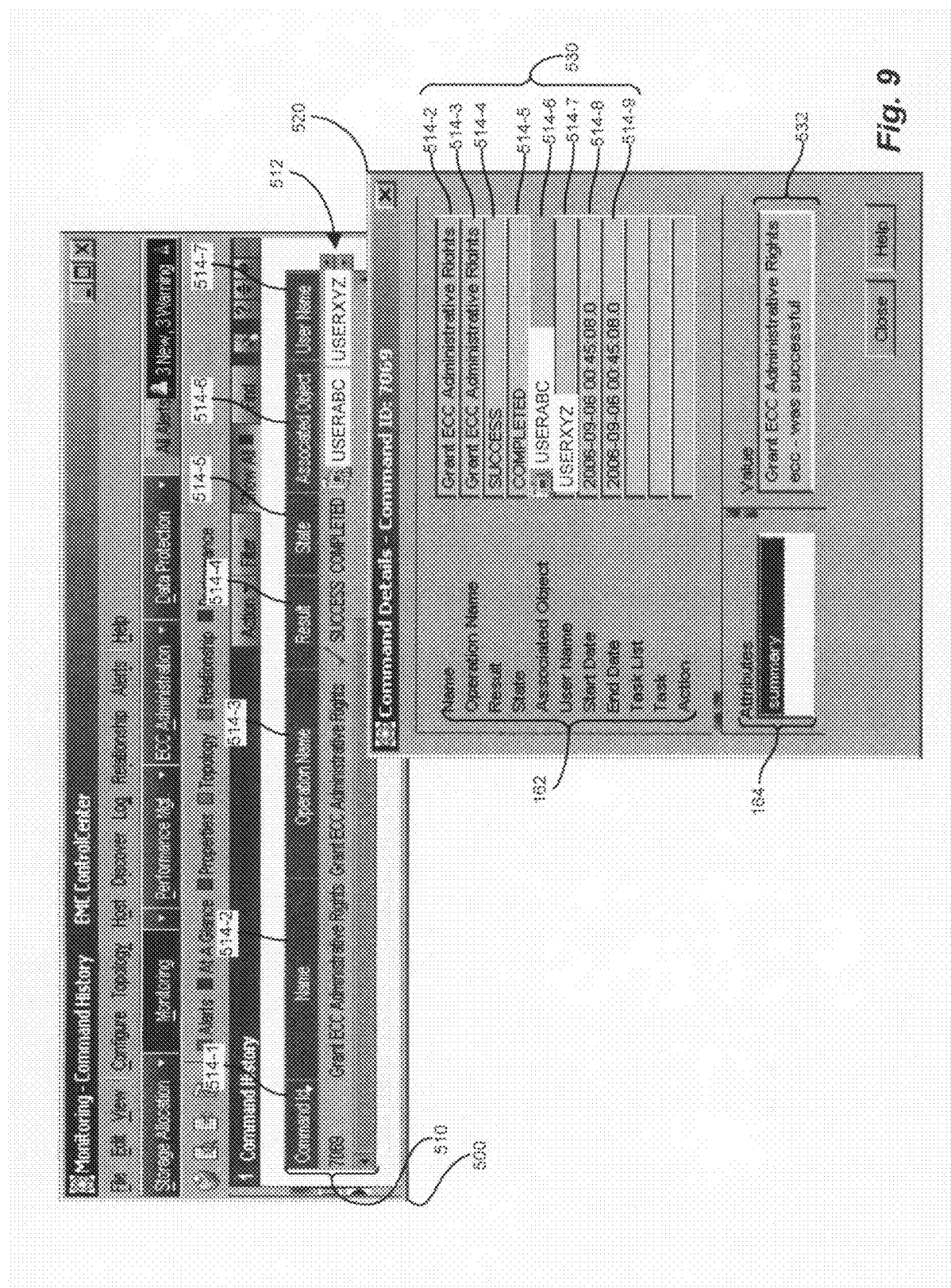
FIG. 9 is a screen display of an event corresponding to a user action object.

The coalescer 150 records a plurality of coalesced user action objects 160 in the repository 134 for subsequent review and analysis, as shown at step 324. In the example arrangement, the repository 134 is a database and the coalescer 150 stores the user action objects 160 in a database log. Retrieval is effected via the GUI 142', which may or may not be the same as the console 140 GUI 142. Upon retrieval, selection of an export log or GUI screen display, shown below in FIGS. 8-9, is performed, as shown at step 326. A GUI 142' selection results in displaying the user action objects 160 via the GUI window 142', as depicted at step 327. The GUI window employs a plurality of windows and displays each of the properties 162 in a corresponding icon, as shown at step 328. The GUI 142' further renders each of the attributes 164 corresponding to the displayed user action object in an attribute window, as shown at step 329.

If the export log is chosen at step 326, then the coalescer exports the user action objects 160 from the user action log 165 to an export file 166 of other suitable nonvolatile media, as depicted at step 330. The user action log 165 may be a database file managed by a database management (DBMS) system such as an Oracle® database. The export files 166 are intended to be an independent output format not dependent on a DBMS organization, thus particularly suited for report output. Alternatively, in particular configurations, the repository may be the export file 166 for primary storage of the user action objects 160, from which GUI displays may be queried.

FIG. 8 is a screen display of a graphical user interface (GUI) for extracting recorded security events. Referring to FIG. 8, a network management screen 400 includes management selections 410. A monitoring icon 410-1 allows monitoring and analysis of alerts (events) corresponding to user actions in the storage area network 110. A selection tree 420 includes expansion icons 420-1 . . . 420-6 of user actions 146 which may be monitored. Each of the selection icons 420-N includes one or more types of user actions 146 which may be monitored, such as a Generic Agent Alert 422. Activation of this icon initiates auditing of user actions 145 pertaining to SAN agents. A variety of user actions 146 maybe monitored, as reflected in the available selection icons 420.

FIG. 9 is a screen display of an event corresponding to a user action object 160. The user action object 160 is operable to transport pertinent fields from each of the services from any of the user actions that constitute an auditable event. The GUI display 142' is operable to display a summary view 510 on a summary window 500, or a detail view 530 in a detail window 520.

In the exemplary windows 500, 520 shown, the user actions are commands, however any suitable user action 146 may be employed and queried. In the example configuration, user actions 146 directed from the console 140 are scrutinized; direction emanating from other sources may be likewise interrogated. The summary view 510 includes one or more line items 512 each including one or more fields 514-1 . . . 514-9. The example fields include Command ID 514-1, Name 514-2, Operation Name 514-3, Result 514-4, State 514-5, Associated Object 514-6, User Name 514-7, Start Date/Time 514-8 and End Date/Time 514-9. The detail window 520 shows fields 514 including a complete list of properties 162, rather than a selectively abridged set, as well the attributes 164 and corresponding values 532.

Those skilled in the art should readily appreciate that the programs and methods for user action security auditing as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for user action security auditing has been particularly shown and described with references to embodiments thereof, it will be understood by those skilled in the art that various changes in form and details may be made therein without departing from the scope of the invention encompassed by the appended claims.

What is claimed is:

1. A method for coalescing user action objects, the method comprising:

monitoring user actions in a storage area network (SAN) having an operator console including a non-transitive computer readable medium for executing processor based instructions;

receiving, in a network server coupled via an interface to the operator console, a user action;

invoking, responsive to the user action, a service performing the user action;

gathering information about the user action;

normalizing the gathered information by building a user action object indicative of the user action, the user action object defining a generic security transaction adaptable to a plurality of services, normalizing further including:

deploying, in each of the services, an event normalizer for populating the generic security transaction;

instantiating, by each of a plurality of dissimilar services, the generic security transaction; and generating the generic security transaction including the information about the user action;

sending, via a preexisting logging conduit, the generic security transaction to a security event coalescer, the preexisting conduit responsive to the generic security transaction, wherein the preexisting conduit is applicable, without modification, to each of the deployed normalizers for transporting a plurality of the security sensitive actions;

coalescing, at the security event coalescer, the sent user action object with at least one other sent user action object; sending and coalescing further including:

sending, by each of the plurality of services, at least one generic security transaction to the security event coalescer, the coalescer responsive to each of the generic security transactions; and receiving, at the security event coalescer, each of the generic security transactions; and recording a plurality of coalesced user action objects.

2. The method of claim 1 further comprising:

performing, by the invoked service, the user action; and generating, by an event normalizer in the invoked service, the user action object.

3. The method of claim 2 wherein gathering information about the user action includes:

identifying properties common to each of the user action objects; and enumerating attributes of the particular user action.

4. The method of claim 3 wherein normalizing includes normalizing the user action object according to a predetermined format, further comprising:

populating the properties common to all actions; and defining values for the attributes specific to the received user action.

5. The method of claim 4 wherein coalescing further comprises:

receiving, from each of a plurality of services, a plurality of user action objects;

identifying properties in each of the sent user action object; and extracting attributes in each of the sent user action objects.

6. The method of claim 1 wherein recording further comprises:

storing, the user action object in a database log and at least one of:

exporting the user action object to a nonvolatile media; or displaying the user action object via a GUI window.

7. The method of claim 6 wherein the GUI employs a plurality of windows, further comprising:

displaying each of the properties in a corresponding icon;

rendering the each of the attributes corresponding to the displayed user action object in an attribute window.

8. The method of claim 1 further comprising receiving the generic security transaction over the preexisting conduit for coalescing, via an event normalizer in each service for populating the generic security transaction with pertinent fields according to the event, the generic security transaction configured to store each of the user actions.

9. The method of claim 1 further comprising receiving the generic security objects at a coalescer common to each of the normalizers in each of the services, the coalescer responsive to the normalizers for rendering the pertinent fields, the rendered persistent fields including properties and attributes based on the pertinent fields of each event.

10. An architecture system, the architecture system comprising:

a storage area network (SAN) server having an operator console;

a non-transitive computer readable medium for executing processor based instructions, the server interfaced to the operator console and configured to audit security sensitive actions across a plurality of services;

a console interface configured for identifying user initiated operations requiring scrutiny as security sensitive actions, the security sensitive actions manipulating the SAN configuration; and a preexisting conduit configured for capturing dissimilar types of events from a plurality of services, the preexisting conduit applicable, without modification, to a plurality of the security sensitive actions, each of the services having an event normalizer populating a user action object adapted to store information about the user initiated operation, further comprising:

identifying properties common to each of the user action objects; and enumerating attributes of the particular user initiated operation, the server further configured for:

directing each of the services of the plurality of services to employ the preexisting conduit for reporting identified security sensitive actions; and reporting security sensitive actions via the preexisting conduit, the security sensitive actions defined by a generic security transaction adaptable to a plurality of the services, each of the services configured to normalize the generic security transaction by:

instantiating, by each of a plurality of dissimilar services, the generic security transaction;

generating the generic security transaction including the information about the user action;

sending at least one generic security transaction to a security event coalescer, the coalescer responsive to each of the generic security transactions for receiving, at the security event coalescer, each of the generic security transactions.

11. A computer program product comprising:

a non-transitive computer readable medium configured to store computer program logic embodied in computer program code encoded as a set of processor based instructions thereon for auditing user actions in a storage area network (SAN);

a processor for executing the computer program logic;

a console interface receiving, in a network server, a user action, the user action indicative of a SAN configuration change;

a server invoking, responsive to the user action, a service for performing the user action;

a SAN management application gathering information about the user action;

an event normalizer in the invoked service normalizing the gathered information by building a user action object indicative of the user action, the service sending, via a preexisting logging conduit, the normalized user action object;

a security event coalescer coalescing the sent user action object with at least one other sent user action object; and a repository recording a plurality of coalesced user action objects, the user action object being a generic security transaction responsive to a plurality of services, the SAN management application:

instantiating, by each of a plurality of dissimilar services, the generic security transaction;

generating the generic security transaction including the information about the user action;

sending, by each of the plurality of services, at least one generic security transaction to the security event coalescer, the coalescer responsive to each of the generic security transactions;

receiving, at the security event coalescer, each of the generic security transactions;

deploying, in each of the services, an event normalizer for populating the generic security transaction; and sending the generic security transaction to the security event coalescer via the preexisting conduit responsive to the generic security transaction, wherein the preexisting conduit is applicable, without modification, to each of the deployed normalizers for transporting a plurality of the security sensitive actions.

12. The computer program product of claim 11 further comprising a plurality of services operable for selective invocation in response to the user action, the services responsive to manageable entities in the SAN, each of the services having an event normalizer operable to:

identify completion of the user action by the invoked service; and generate the user action object corresponding to the completed user action, the user action object responsive to the plurality of services for identifying completion of a user action.

13. The computer program product of claim 12 wherein the event normalizer is further operable to:

identify properties common to each of the user action objects;

enumerate attributes of the particular user action; and populate the user action object with the gathered information including the properties and the attributes.

14. The computer program product of claim 13 wherein the event normalizer is further operable to:

identify a predetermined format indicative of properties and attributes;

populate the properties common to all actions; and define values for the attributes specific to the received user action.

15. The computer program product of claim 14 wherein the coalescer is further operable to:

receive, from each of a plurality of services, a plurality of user action objects;

identify properties in each of the sent user action object; and extract attributes in each of the sent user action objects.

16. The computer program product of claim 11 wherein the management application is further operable to:

store, the user action object in a database log and at least one of:

export the user action object to a nonvolatile media; or display the user action object via a GUI window.

17. The computer program product of claim 16 wherein the GUI employs a plurality of windows, each of the windows responsive to the management application and operable to:

display each of the properties in a corresponding icon; and render the each of the attributes corresponding to the displayed user action object in an attribute window.

* * * * *